US007688969B2

(12) United States Patent
Ichihara

(10) Patent No.: US 7,688,969 B2
(45) Date of Patent: Mar. 30, 2010

(54) OPERATION DIAL WITH ROTARY ENCODER

(75) Inventor: Takashi Ichihara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 918 days.

(21) Appl. No.: 11/355,938

(22) Filed: Feb. 16, 2006

(65) Prior Publication Data

US 2006/0181434 A1 Aug. 17, 2006

(30) Foreign Application Priority Data

Feb. 17, 2005 (JP) ............................ 2005-040542

(51) Int. Cl.
*H01H 19/11* (2006.01)
*F24F 11/053* (2006.01)
*G05D 23/12* (2006.01)
*H04M 9/00* (2006.01)
*H04M 1/00* (2006.01)

(52) U.S. Cl. ................. 379/428.01; 236/1 C; 200/11 R

(58) Field of Classification Search ................. 200/332, 200/4, 5 R, 11 R, 11 TC, 11 DA, 336; 236/1 C, 236/94
See application file for complete search history.

(56) References Cited

U.S. PATENT DOCUMENTS 6,512,189 B1 * 1/2003 Schuberth et al. ........... 200/334
6,667,446 B1 * 12/2003 Schuberth et al. .............. 200/4
7,140,271 B2 * 11/2006 Hall ............................ 74/553
7,140,551 B2 * 11/2006 de Pauw et al. ............... 236/94
7,159,789 B2 * 1/2007 Schwendinger et al. ..... 236/1 C
7,159,790 B2 * 1/2007 Schwendinger et al. ..... 236/1 C
7,264,175 B2 * 9/2007 Schwendinger et al. ....... 236/94
7,348,503 B2 * 3/2008 Shiroyama et al. ............. 200/4
2004/0245080 A1 * 12/2004 Turner ......................... 200/329
2005/0230594 A1 * 10/2005 Sato et al. ................... 248/652
2007/0158444 A1 * 7/2007 Naujok et al. ............. 236/91 D
2008/0023309 A1 * 1/2008 Montalvo ................... 200/332

FOREIGN PATENT DOCUMENTS

JP 63-50103 4/1988
JP 2000-133086 5/2000
JP 2001184969 A * 7/2001
JP 2002-040543 2/2002

* cited by examiner

*Primary Examiner*—Fan Tsang
*Assistant Examiner*—Phylesha Dabney
(74) *Attorney, Agent, or Firm*—RatnerPrestia

(57) ABSTRACT

An electronic apparatus includes an operation dial, a board disposed at an inner position from the operation dial, a rotary encoder disposed on a surface of the board on the side opposite to the operation dial side, and a connection member which engages with an encoder shaft of the rotary encoder and is connected with the operation dial. The electronic apparatus is capable of reducing a projection of the operation dial from a surface of an operation panel and thus improving design of the electronic apparatus.

5 Claims, 6 Drawing Sheets

OPERATION DIAL WITH ROTARY ENCODER

BACKGROUND OF THE INVENTION

1. Field of the Invention

The invention relates to an electronic apparatus having a rotatable element for operation such as a dial.

2. Background

As illustrated in FIG. 6, a conventional electronic apparatus includes an operation dial 101 and a board 103 disposed at the inner position from the operation dial 101. A rotation shaft 105 of the operation dial 101 is provided between the operation dial 101 and the board 103. The operation dial 101 rotates around the rotation shaft 105. This type of electronic apparatus is disclosed in JP-A-2000-133086, for example.

Another example of a conventional electronic apparatus includes an annular operation dial which is rotated for mode setting. This operation dial has a liquid crystal display device on a surface of the annular portion. Compared with the structure in which the liquid crystal display device is provided separately from the dial, this structure requires smaller space for disposing these components. This type of electronic apparatus is disclosed in JP-A-2002-40543, for example.

In these conventional electronic apparatus, however, the rotation shaft of the operation dial projects toward the operator side from the circuit board. Accordingly, the operation dial considerably projects from an operation panel of the electronic apparatus toward the front (toward the operator side). This is not preferable from the viewpoint of design of the electronic apparatus. Moreover, in the structure where the rotation shaft of the operation dial extends toward the operator side, a display component cannot be positioned on the central portion of the operation dial. Examples of the display component involve a VFD (vacuum fluorescent display), an LCD (liquid crystal display), and other devices.

SUMMARY OF THE INVENTION

The invention has been developed to solve the above problems. It is therefore an object of the invention to provide an electronic apparatus capable of reducing a projection of an operation dial from a surface of an operation panel of the electronic apparatus and thus improving design of the electronic apparatus.

The electronic apparatus according to an aspect of the invention includes: an operation dial; a board disposed at an inner position from the operation dial; a rotary encoder disposed on a surface of the board on a side opposite to the operation dial side; and a connection member which engages with an encoder shaft of the rotary encoder and is connected with the operation dial.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

DESCRIPTION OF THE PREFERRED EMBODIMENT

Figure 1:
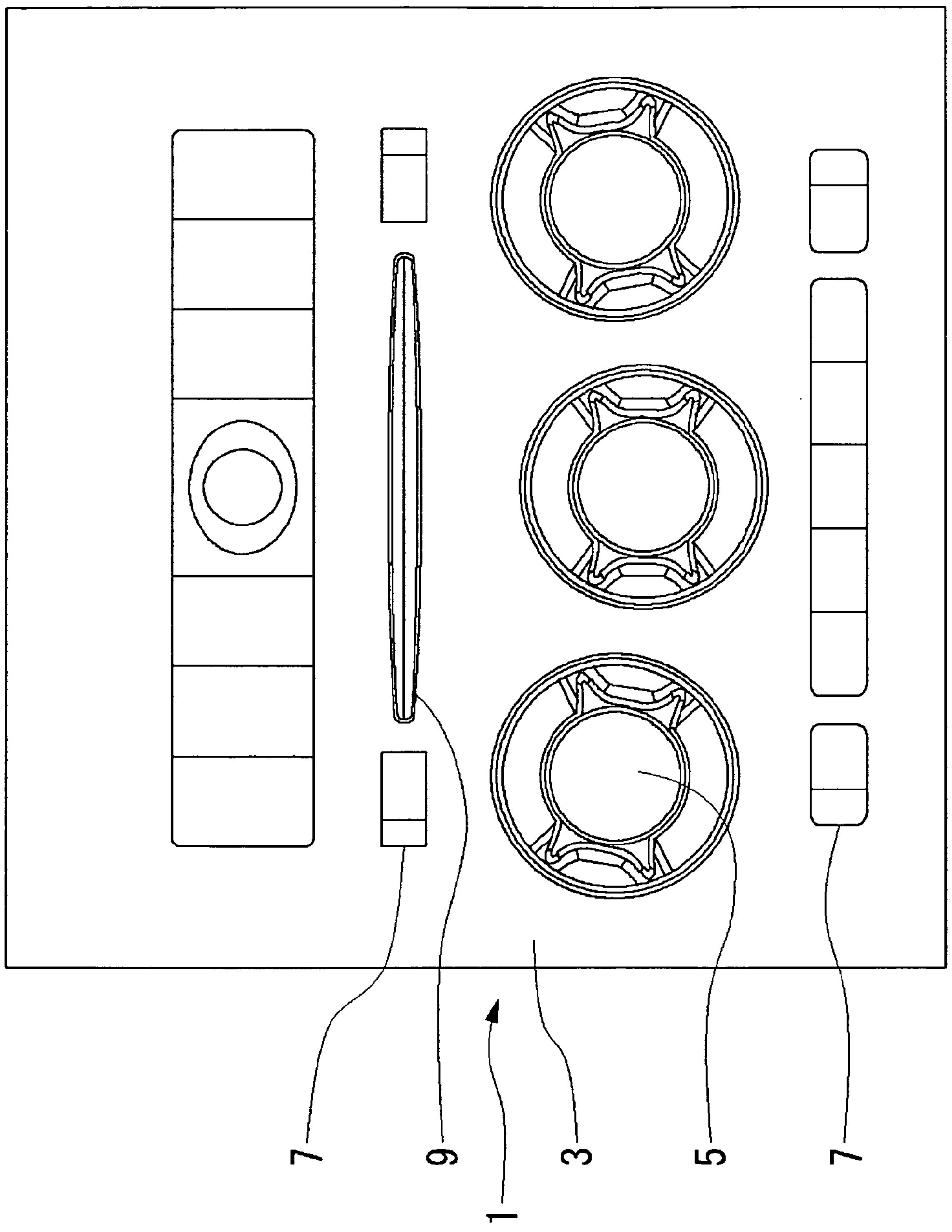
FIG. 1 is a front view of an electronic apparatus in an embodiment according to the invention.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

An electronic apparatus according to this embodiment includes: an operation dial; a board disposed at an inner position from the operation dial; a rotary encoder disposed on a surface of the board on a side opposite to the operation dial side; and a connection member which engages with an encoder shaft of the rotary encoder and is connected with the operation dial.

In this structure, since the rotary encoder is disposed on the side opposite to the operation dial side, a distance between the operation dial and the board can be decreased. Therefore, a projection of the operation dial from the surface of an operation panel of the electronic apparatus can be reduced, and thus the design of the electronic apparatus can be improved.

The electronic apparatus may further include: a display window provided on the front surface of the operation dial; and a display member which is provided on the surface of the board on the operation dial side and is visually recognizable through the display window.

In this structure, since a rotation shaft of the operation dial is not disposed on an operator side, the display member such as an LCD can be positioned at the inner position from the operation dial.

The display member and the rotary encoder may be disposed in such a region that the display member and the rotary encoder overlap with each other as viewed in the direction toward an inside.

In this structure, components such as a VFD and an LCD can be disposed at the center of the operation dial, and thus design of the electronic apparatus can be improved.

The connection member may have a first connection member which is rotatably attached to a fixed pedestal and connected to the operation dial, and a second connection member which engages with the encoder shaft and with the first connection member.

In this structure, generation of backlash or lash at the operation dial can be prevented.

The electronic apparatus may further include rubber bushings provided at the engaging portion between the first connection member and the second connection member. For the engagement between the first connection member and the second connection member, the electronic apparatus may be so structured that engaging claws of the second connection member engage with holes of the rubber bushings provided on the first connection member.

In this structure, since the rubber bushings absorb dimensional errors, generation of backlash or lash at the operation dial can be prevented.

In the electronic apparatus according to this embodiment, therefore, the rotary encoder can be operated by rotating the operation dial. Particularly, the operation dial and the rotary encoder are disposed such that the encoder shaft projects from the board in the direction opposite to the direction toward the operation dial. This arrangement reduces the projection of the operation dial from the operation panel, and thus improves the design of the electronic apparatus.

A preferred embodiment according to the invention is hereinafter described with reference to the appended drawings.

FIG. 1 illustrates an electronic apparatus in the embodiment according to the invention.

In FIG. 1, an electronic apparatus 1 is a device such as an audio device provided within a compartment of an automobile and an air conditioner for controlling a temperature of the vehicle compartment. An operation panel 3 is equipped as an outer casing of the electronic apparatus 1. The operation panel 3 has operation dials 5 and operation buttons 7 for operation of the electronic apparatus 1. A user uses these operation dials 5 and operation buttons 7 for reproducing media inserted through a media insertion inlet 9, receiving radio broadcasting, and controlling temperature settings of the air conditioner.

Figure 2:
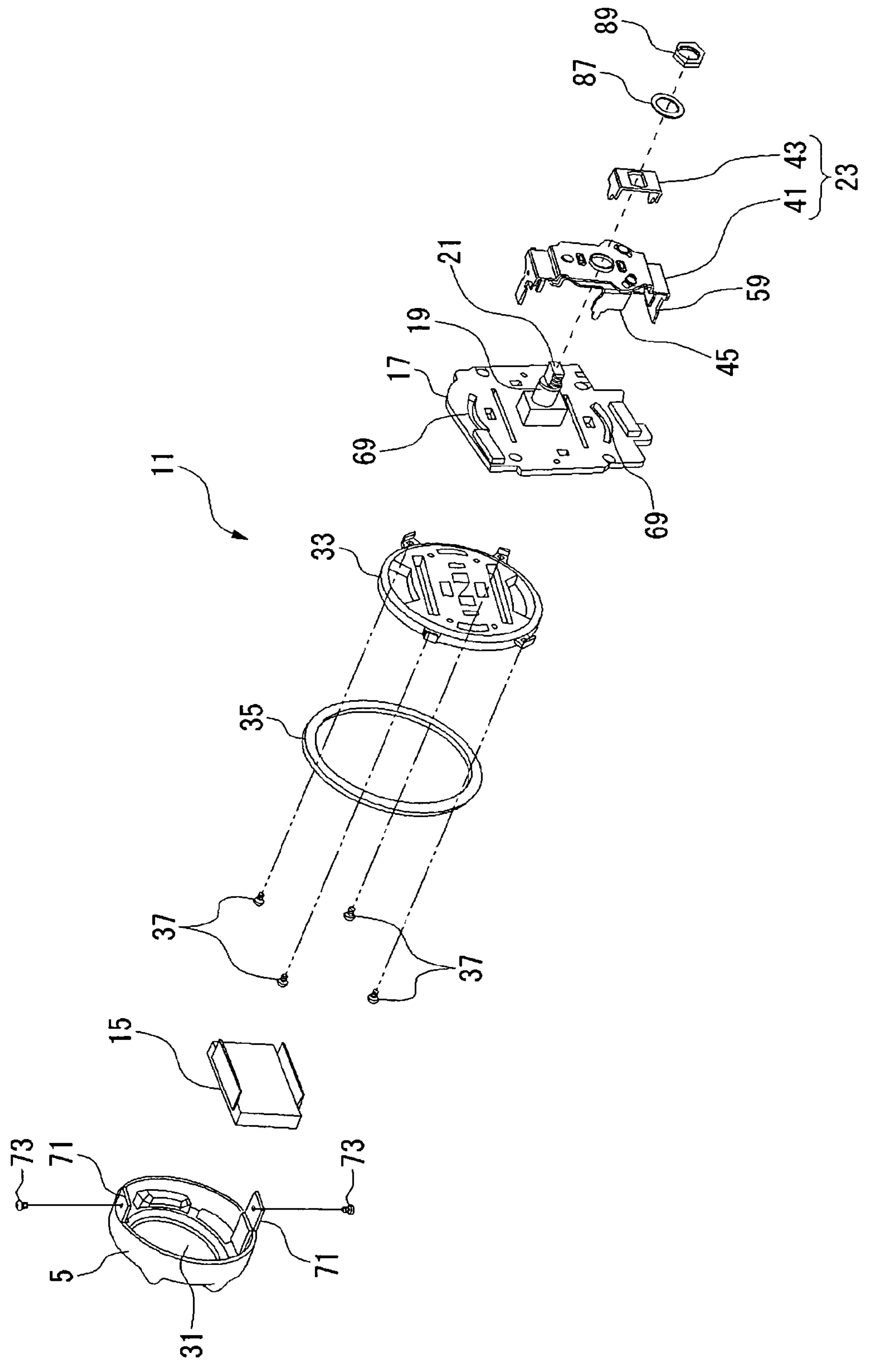
FIG. 2 is a perspective view illustrating a disassembled operation dial unit.

FIG. 2 illustrates details of an operation dial unit 11 included in the electronic apparatus 1 in this embodiment. FIG. 2 is a perspective view showing disassembled components of the operation dial unit 11 as viewed diagonally from the rear. In FIG. 2, an upper left corresponds to a front side of the electronic apparatus 1, while a lower right corresponds to an inside (rear side) thereof. The direction from the upper left to the lower right is actually a direction toward the inside of the electronic apparatus 1.

As illustrated in FIG. 2, the operation dial unit 11 has the operation dial 5 to be operated by the user. As apparent from FIG. 1, the operation dial 5 is equipped on the surface of the operation panel 3. Furthermore, the operation dial unit 11 has the following components toward the inside. That is, the operation dial unit 11 has a display member 15, a printed board 17, a rotary encoder 19, and a connection member 23. The display member 15 is a VFD or the like capable of displaying information. The printed board 17 supplies electric signals to the display member 15. The rotary encoder 19, which is disposed on a surface of the printed board 17 on a side opposite to the display member 15 side, has an encoder shaft 21. The connection member 23 engages with a tip of the encoder shaft 21 which rotates the rotary encoder 19. The connection member 23 transmits rotational motion of the operation dial 5 to the rotary encoder 19. The connection member 23 has a separable structure.

Figure 3:
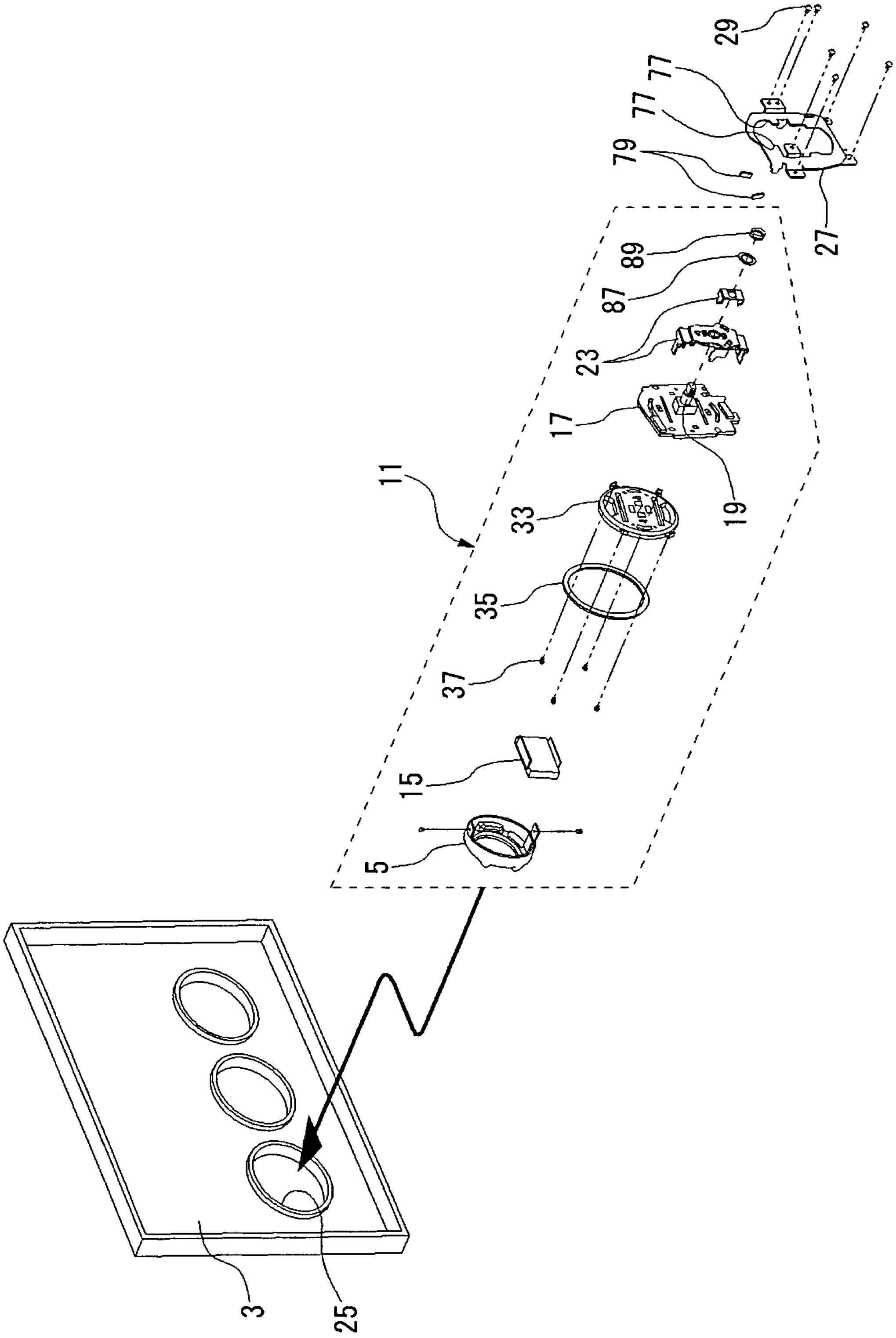
FIG. 3 shows the operation dial unit and an operation panel.

As illustrated in FIG. 3, the operation dial unit 11 is attached to an attachment hole 25 formed on the operation panel 3. The operation dial unit 11 further includes a unit attachment plate (unit chassis) 27. The unit attachment plate 27 is made of iron plate. The printed board 17 on which various components are mounted is fixed to the unit attachment plate 27. The unit attachment plate 27 is secured to the operation panel 3 by screws 29. By this method, the operation dial unit 11 is attached to the operation panel 3.

The operation dial 5 projects from the operation panel 3 toward the user side so that the user can operate the operation dial 5. However, concavities are formed on the outer periphery of the operation dial 5 so as to reduce the projection of the operation dial 5 from the operation panel 3. The user operates the operation dial 5 by putting his/her fingers on the concavities. This structure secures preferable maneuverability of the operation dial 5 even when the projection of the operation dial 5 is small.

The operation dial 5 is ring-shaped. The operation dial 5 has a display window 31 at its center. A light-transmissive resin plate is attached to the display window 31. The display member 15 is disposed behind the operation dial 5 at the inner position therefrom and at the rear of the display window 31. The user visually recognizes the display contents on the display member 15 through the display window 31.

The operation dial unit 11 corresponds to a temperature setting dial of an air conditioner, for example, and the display member 15 displays the set temperature of the air conditioner. By the clockwise rotation of the operation dial 5, the set temperature displayed on the display member 15 rises. By the anti-clockwise rotation of the operation dial 5, the set temperature on the display member 15 lowers.

The display member 15 is positioned approximately at the center of the operation dial 5. The display member 15 is fixed to the printed board 17 using a display member holding plate 33. That is, the display member 15 is held by the display member holding plate 33, and the display member holding plate 33 is secured to the printed board 17. The display member holding plate 33 also has a function for positioning the operation panel 3 and the operation dial unit 11. In addition, the display member holding plate 33 has a light-shielding ring 35 for controlling the amount of light to be introduced from the LED on the printed board 17 to the operation panel 3. The light-shielding ring 35 is attached to the display member holding plate 33 by screws 37.

The rotary encoder 19 is a self-return-type (spring-back-type) encoder. The rotary encoder 19 has the encoder shaft 21 which is roatatable. The rotary encoder 19 contains a spring for providing self-return motion. The encoder shaft 21 corresponds to the rotation shaft of the encoder. When no torque is given to the encoder shaft 21, the encoder shaft 21 is positioned at a predetermined neutral position. When torque larger than the urging force of the spring is given to the encoder shaft 21, the encoder shaft 21 rotates. When the torque is released, the encoder shaft 21 returns to the neutral position by the urging force of the spring. The rotary encoder 19 may be a general-purpose-type component.

In this embodiment, the rotary encoder 19 is fixed to the rear surface of the printed board 17. That is, the rotary encoder 19 is positioned on the surface of the board on the side opposite to the display member 15 side. The encoder shaft 21 projects from the printed board 17 to the inside. The rotary encoder 19 disposed at this position is not interposed between the operation dial 5 and the printed board 17. This arrangement decreases the distance between the operation dial 5 and the printed board 17, thereby reducing the projection of the operation dial 5.

Since the rotary encoder 19 is disposed at the inner position, the position of the rotary encoder 19 and the position of the display member 15 do not interfere with each other. Therefore, no limitation is imposed on the positioning of the display member 15 by the position of the rotary encoder 19. Thus, the display member 15 is disposed in such a region that the display member 15 overlaps with the rotary encoder 19 as viewed in the direction toward inside. More specifically, the display member 15 and the rotary encoder 19 are both positioned at the center of the dial on the front and the rear surfaces of the printed board 17, respectively. Since the display member 15 is disposed at the center, the display member 15 and its display area can be enlarged, which allows the display to be more easily recognized. This advantage is preferable in view of both design and function.

Figure 4:
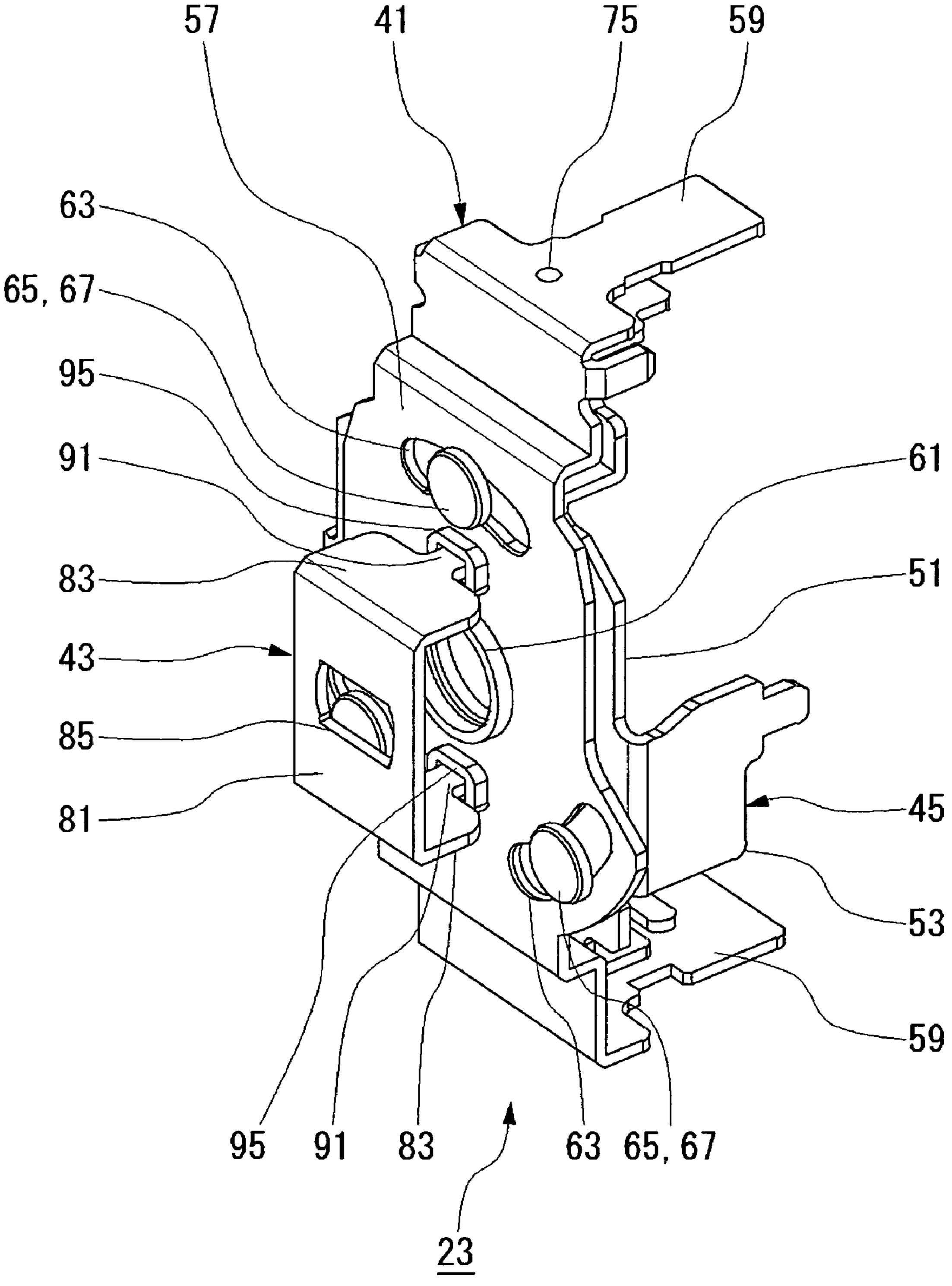
FIG. 4 is a perspective view of a connection member.
Figure 5B:
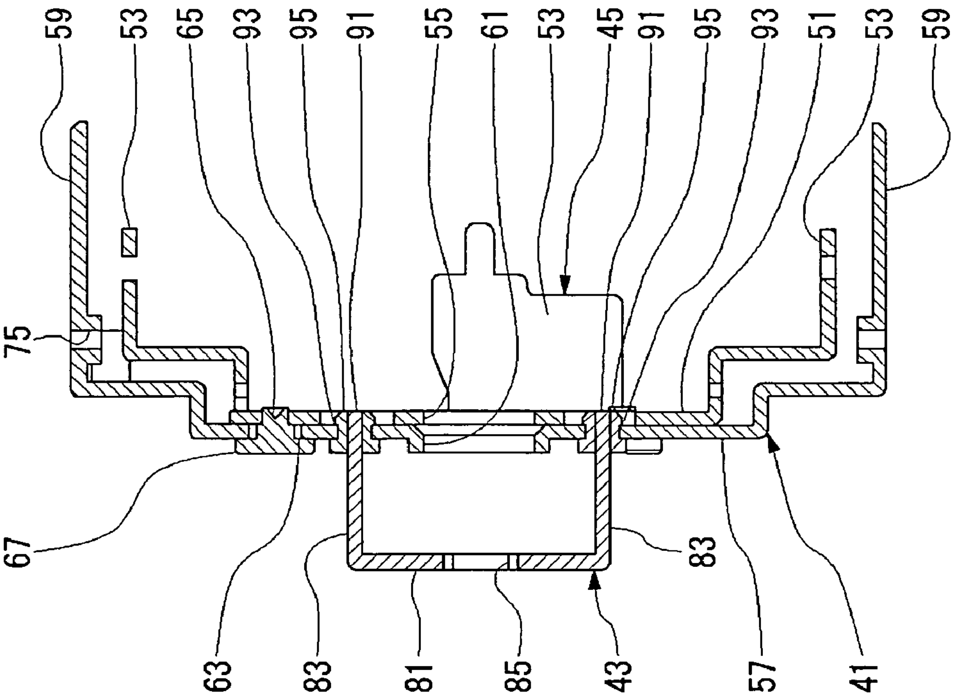
FIG. 5B is a cross-sectional view of the connection member.
Figure 5A:
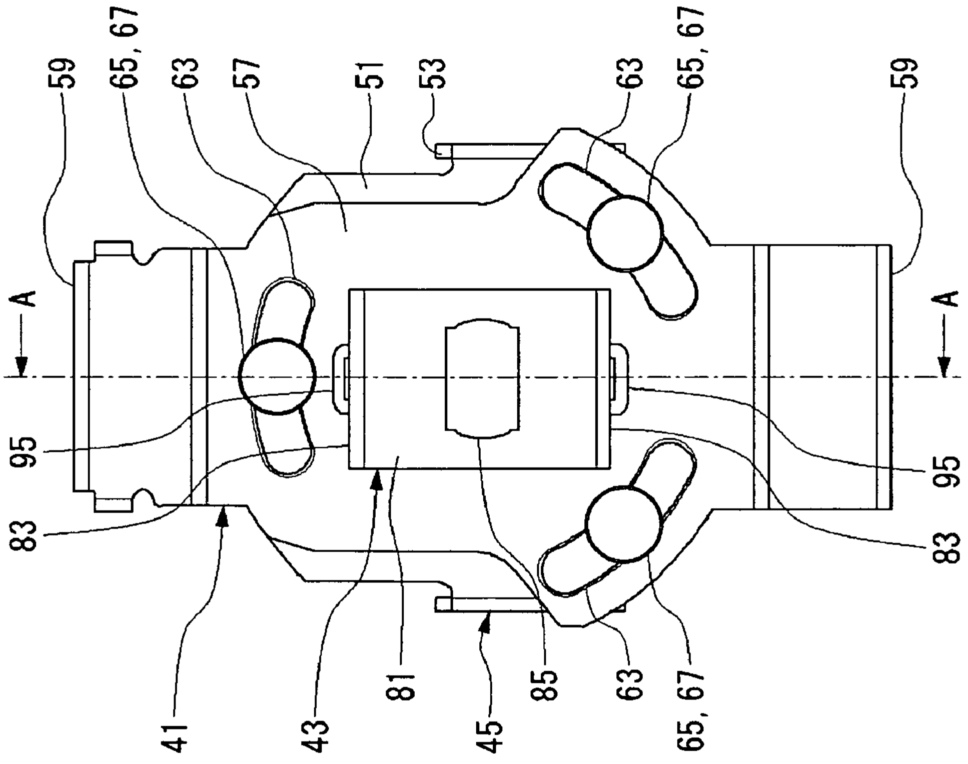
FIG. 5A is a front view of the connection member.
Figure 6:
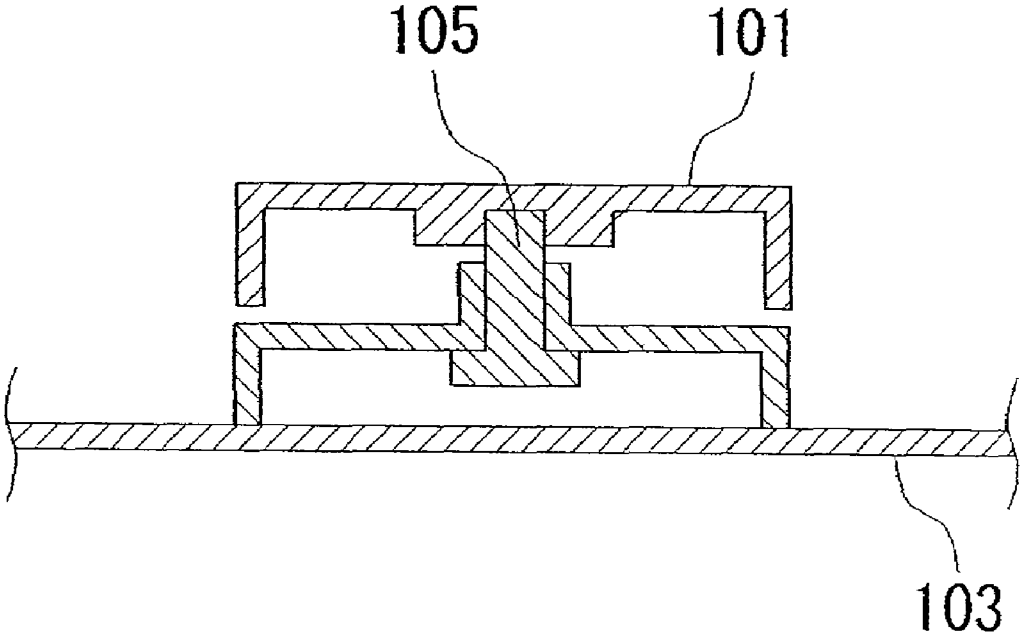
FIG. 6 PRIOR ART
FIG. 6 illustrates a conventional electronic apparatus.

Next, the detailed structure of the connection member 23 is discussed. The separable structure of the connection member 23 is herein explained. FIGS. 4, 5A and 5B illustrate the detailed structure of the connection member 23. FIG. 4 is a perspective view, FIG. 5A is a rear view, and FIG. 5B is a cross-sectional view of the connection member 23 cut along a line A-A.

As illustrated in FIGS. 4, 5A and 5B, the connection member 23 has a separable structure constituted by a first connection member 41 and second connection member 43. The first connection member 41 is connected with the operation dial 5. The second connection member 43 engages with the encoder shaft 21. The first connection member 41 and the second connection member 43 engage with each other. The first connection member 41 is rotatably fitted to a fixed pedestal 45. The first connection member 41, the second connection member 43 and the fixed pedestal 45 are all sheet metal components. The structures of these components are now described in detail.

The fixed pedestal 45 has a base plate 51 extending parallel to the printed board 17, and a leg 53 extending from an end of the base plate 51 toward the printed board 17. The leg 53 is secured to the printed board 17 by caulking. Thus, the base plate 51 is fixed at a position parallel with the printed board 17. The base plate 51 has a through hole 55 at its center, through which hole the encoder shaft 21 can be inserted.

The first connection member 41 is a movable component. The first connection member 41 has a rotary plate 57, and connection arms 59 extending from both ends of the rotary plate 57 toward the printed board 17. The rotary plate 57 is disposed in such a position as to overlap with the base plate 51 of the fixed pedestal 45. The rotary plate 57 is rotatably attached to the base plate 51.

More specifically, the rotary plate 57 has a through hole 61 at its center, through which hole the encoder shaft 21 can be inserted. Three circular-arc-shaped long holes 63 are formed such that the through hole 61 is surrounded by the long holes 63. The center of the circular arc of the long holes 63 corresponds to the rotation axis of the encoder shaft 21. Pins 65 project from the base plate 51, and each of the pins 65 penetrates through the corresponding long hole 63. The width of heads 67 of the pins 65 is larger than the width of the long holes 63. When the rotary plate 57 is rotated, the pins 65 shift within the long holes 63. In this structure, the rotary plate 57 slides relative to the base plate 51 while contacting therewith. Then, the rotary plate 57 rotates around the encoder shaft 21. The heads 67 of the pins 65 restrict the motion of the rotary plate 57 in the front-to-rear direction such that no lash is produced between the rotary plate 57 and the base plate 51.

The connection arms 59 pass through circular-arc-shaped long holes 69 penetrating the printed board 17 (FIG. 2), and extend to the opposite side of the printed board 17 (front side). The operation dial 5 also has two connection arms 71. The connection arms 71 pass through the long holes 69 of the printed board 17, and extend to the opposite side of the printed board 17 (rear side). The connection arm 71 of the operation dial 5 overlap with the connection arms 59 of the first connection member 41. The connection arms 71 and the connection arms 59 are connected with each other by screws 73 (FIG. 2). The screws 73 are inserted through holes of the connection arms 71 to be tightened at holes 75 of the connection arms 59. The screws 73 connect both the arms at the back of the printed board 17. However, the screws 73 may be positioned at the front of the printed board 17.

In this embodiment, the rotary encoder 19 is a self-return-type encoder and thus the movable range of the dial is limited. The long holes 69 of the printed board 17 are slightly larger than the movable range of the dial. This also applies to the long holes 63 of the base plate 51. The unit attachment plate 27 has contact portions 77 at both ends of the movable range of the dial (FIG. 3), with which portions 77 the fist connection member 41 contact. The contact portions 77 are wall surfaces formed by folding the unit attachment plate 27. Rubber chips 79 are attached to the contact portions 77. The rotary plate 57 of the first connection member 41 contacts the rubber chips 79 at both ends of the movable range which is established for the rotary encoder 19.

Next, the second connection member 43 is explained. The second connection member 43 has an engaging plate 81, and engaging legs 83 extending from both ends of the engaging plate 81 toward the rotary plate 57 of the first connection member 41. The engaging plate 81 is disposed parallel with the rotary plate 57. The engaging plate 81 is perpendicular to the rotation axis of the encoder shaft 21. The engaging plate 81 has an engaging hole 85 at its center. The tip of the encoder shaft 21 is inserted through the engaging hole 85 to engage therewith. An edge of the engaging hole 85 engages with two parallel surfaces of the shaft tip. This structure determines an angle position of the second connection member 43 relative to the encoder shaft 21. A male screw is formed on the outer periphery of the tip of the encoder shaft 21. A washer 87 is attached to the encoder shaft 21, and a nut 89 is tightened thereto. By this method, the second connection member 43 is secured to the encoder shaft 21.

The engaging legs 83 extend close to the rotary plate 57 of the first connection member 41. Engaging claws 91 project from the tips of the engaging legs 83. Rubber bushings 95 engage with holes 93 of the rotary plate 57. The engaging claws 91 engage with holes of the rubber bushings 95. By this structure, the second connection member 43 and the first connection member 41 engage with each other, and this engagement allows the second and first connection members 43 and 41 to rotate clockwise and anti-clockwise together.

The separable structure of the connection member 23 described above has a function for reducing backlash or lash generated at the operation dial 5, which will be discussed below.

In this embodiment, the rotary encoder 19 is provided at the inner position from the printed board 17. This arrangement reduces the projection of the dial, but increases a distance between the encoder shaft 21 and the operation dial 5. If a "long single component" simply connects the encoder shaft 21 and the operation dial 5 which are far away from each other, slight backlash generated at the encoder shaft 21 expands due to the swinging motion of the "long single component". As a result, large backlash is produced at the operation dial 5.

To cope with this problem, the connection member 23 is so formed as to be separable into the first connection member 41 and the second connection member 43 in this embodiment. The first connection member 41 is connected with the operation dial 5, and rotatably attached to the fixed pedestal 45. The second connection member 43 engages with both the encoder shaft 21 and the first connection member 41.

Accordingly, backlash generated at the encoder shaft 21 is transmitted to the second connection member 43 but not to the operation dial 5. Backlash produced at the operation dial 5 is determined by backlash caused between the fixed pedestal 45 and the first connection member 41. The backlash to be generated between the fixed pedestal 45 and the first connection member 41 can be reduced by the sliding structure described above. Thus, backlash produced at the operation dial 5 can be considerably reduced by the separable connection structure.

In this embodiment, the rubber bushings 95 are provided at the engaging portion between the first connection member 41 and the second connection member 43. The rubber bushings 95 absorb the dimensional errors of the components and reduce backlash generated at the operation dial 5 in the following manner. That is, the dimensional errors (including errors of attachment positions) at the plural components such as the printed board 17, the rotary encoder 19, the first connection member 41, the second connection member 43, and the fixed pedestal 45 are accumulated. Therefore, positional deviation is inevitably produced at the engaging portion between the first connection member 41 and the second connection member 43. For allowing the positional deviation, a certain clearance to be provided at the engaging portion may be considered. However, this clearance may cause backlash when the operation dial 5 is operated. In this embodiment, therefore, the rubber bushings 95 are equipped so that the dimensional errors can be absorbed. These bushings 95 bring the first and second connection members 41 and 43 into tight contact with each other at the engaging portion. This structure also reduces backlash generated at the operation dial 5 and improves comfortableness for operation.

Next, the operation of the electronic apparatus 1 is described. An example in which the operation dial unit 11 is used as a temperature setting dial of an air conditioner is herein discussed. The display member 15 displays the set temperatures.

When the operation dial 5 is rotated by the user, the rotational motion is transmitted to the encoder shaft 21 on the opposite side of the printed board 17 by the connection member 23. More specifically, when the operation dial 5 is rotated, the first connection member 41 connected with the operation dial 5 is rotated accordingly. Since the first connection member 41 engages with the second connection member 43, the second connection member 43 is also rotated. The rubber bushings 95 of the first connection member 41 push the engaging claws 91 of the second connection member 43. Since the second connection member 43 engages with the encoder shaft 21, the encoder shaft 21 is also rotated.

When the encoder shaft 21 is rotated to a predetermined angle, the rotary encoder 19 sends operation detection signals to the printed board 17. The operation detection signals are transmitted to the main board of the air conditioner to be processed thereat. The set temperature is changed. The information on the set temperature which has been newly established is given to the printed board 17. The printed board 17 displays the information on the set temperature on the display member 15. Thus, the display on the display member 15 can be changed according to the operation of the operation dial 5.

When the fingers of the user are removed from the operation dial 5, the torque acting on the encoder shaft 21 is released. Then, the encoder shaft 21 rotates by the urging force of the spring contained in the rotary encoder 19, and returns to the original neutral position. When the encoder shaft 21 is rotated, the second connection member 43 attached to the encoder shaft 21 is rotated accordingly. The first connection member 41 is pushed by the second connection member 43 and rotated, and the operation dial 5 is rotated together with the first connection member 41. Thus, when the encoder shaft 21 returns to the neutral position, the operation dial 5 connected with the encoder shaft 21 also returns to the neutral position.

In the electronic apparatus 1 having been described according to this embodiment, the rotary encoder 19 is positioned on the surface of the printed board 17 on the side opposite to the operation dial 5 side. The connection member 23 engages with the encoder shaft 21 of the rotary encoder 19, and is connected with the operation dial 5. This structure decreases the distance between the operation dial 5 and the printed board 17, and thus reduces the projection of the operation dial 5 from the outer surface of the operation panel 3 of the electronic apparatus 1. Accordingly, the design of the electronic apparatus 1 can be improved.

In this embodiment, since the rotation shaft of the operation dial 5 is not disposed on the operator side, the display member can be positioned at the inner position from the operation dial 5.

In this embodiment, the display member 15 and the rotary encoder 19 are disposed in such a region that the two components overlap with each other (as viewed) toward the inside. This arrangement allows the display member to be positioned at the center of the operation dial 5, and thus improves the design of the electronic apparatus 1.

In this embodiment, since the connection member 23 has the separable structure mentioned above, generation of backlash or lash at the operation dial 5 can be prevented.

In this embodiment, the rubber bushings are provided at the engaging portion between the first connection member 41 and the second connection member 43 of the separable structure. Thus, generation of backlash or lash at the operation dial 5 can be prevented.

In this embodiment, the engaging claws 91 of the second connection member 43 engage with the holes of the rubber bushings 95 provided on the first connection member 41. However, the reverse structure can be employed. That is, the rubber bushings may be provided on the second connection member 43, and the engaging claws may be formed on the first connection member 41.

While the rotary encoder 19 is a self-return-type encoder in this embodiment, the encoder to be used in the invention is not limited to this type of rotary encoder.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. An electronic apparatus, comprising:

an operation dial;

a board disposed at an inner position from the operation dial;

a rotary encoder disposed on a surface of the board on a side opposite to the operation dial side, and having an encoder shaft that projects from the rotary encoder in a direction away from the operation dial; and a connection member disposed adjacent to the board on the side opposite to the operation dial and engaging with the encoder shaft of the rotary encoder and connected with the operation dial, wherein:

the board includes a plurality of rotation slots formed therethrough; and the connection member includes a plurality of connection arms passing through the rotation slots and connected to the operation dial such that when the operation dial is rotated each connection arm moves within a respective rotation slot.

2. An electronic apparatus according to claim 1, further comprising:

a display window provided on a front surface of the operation dial; and a display member which is provided on a surface of the board on a same side as the operation dial and visually recognizable through the display window.

3. An electronic apparatus according to claim 2, wherein the display member and the rotary encoder are disposed in such a region that the display member and the rotary encoder overlap with each other as viewed in a direction toward the inside.

4. An electronic apparatus according to claim 1, wherein the connection member has a first connection member which is rotatably attached to a fixed pedestal and connected to the operation dial, and a second connection member which engages with the encoder shaft and with the first connection member.

5. An electronic apparatus according to claim 4, further comprising rubber bushings provided at an engaging portion between the first connection member and the second connection member.

* * * * *